US010781649B2

United States Patent
Ochoa et al.

(10) Patent No.: US 10,781,649 B2
(45) Date of Patent: Sep. 22, 2020

(54) APPARATUS AND METHODS FOR DETERMINING IN REAL-TIME EFFICIENCY EXTRACTING GAS FROM DRILLING FLUID AT SURFACE

(71) Applicants: Brian B. Ochoa, Hannover (DE); Nicklas Jeremias Ritzmann, Celle (DE)

(72) Inventors: Brian B. Ochoa, Hannover (DE); Nicklas Jeremias Ritzmann, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 272 days.

(21) Appl. No.: 14/939,107

(22) Filed: Nov. 12, 2015

(65) Prior Publication Data

US 2017/0138136 A1 May 18, 2017

(51) Int. Cl.
*E21B 21/06* (2006.01)
*B01D 19/00* (2006.01)
(Continued)

(52) U.S. Cl.
CPC ........ *E21B 21/067* (2013.01); *B01D 19/0036* (2013.01); *B01D 19/0042* (2013.01);
(Continued)

(58) Field of Classification Search
CPC .............. E21B 21/067; B01D 19/0042; B01D 19/0052
See application file for complete search history.

(56) References Cited

U.S. PATENT DOCUMENTS 4,635,735 A    1/1987    Crownover
4,887,464 A    11/1989    Tannenbaum et al.
(Continued)

FOREIGN PATENT DOCUMENTS

| WO | 2014037731 A1 | 3/2014 |
| WO | 2015006552 A1 | 1/2015 |
| WO | 2015076839 A1 | 5/2015 |

OTHER PUBLICATIONS

PCT International Search Report and Written Opinion; International Application No. PCT/US2016/060801; International Filing Date: Nov. 7, 2016; dated Feb. 9, 2017; pp. 1-16.

*Primary Examiner* — Paul M. West
(74) *Attorney, Agent, or Firm* — Cantor Colburn LLP

(57) ABSTRACT

In one aspect, a method for determining amount of selected gas extracted from a drilling fluid during drilling of a wellbore and total amount of gas present in such fluid is disclosed, that in one embodiment may include; flowing the drilling fluid through a gas trap at a constant flow rate; extracting the selected gas released from the drilling fluid flowing through gas trap and determining therefrom the amount of the extracted gas from the drilling fluid; trapping a constant volume of the drilling fluid in the gas trap; extracting the selected gas released from the constant volume and determining therefrom the total amount of the selected gas present in the drilling during drilling of the wellbore. The method further includes determining the efficiency of the gas extraction process from the amount of the selected gas extracted from the fluid flowing through the gas tap and the total amount of the gas in the constant volume.

12 Claims, 1 Drawing Sheet

(51) Int. Cl.
*E21B 49/00* (2006.01)
*E21B 49/08* (2006.01)

(52) U.S. Cl.
CPC ........ *B01D 19/0052* (2013.01); *E21B 49/005* (2013.01); *E21B 49/086* (2013.01); *E21B 21/065* (2013.01)

(56) References Cited

U.S. PATENT DOCUMENTS

| | | | |
|---|---|---|---|
| 4,904,603 A | 2/1990 | Jones et al. |
| 6,176,323 B1 | 1/2001 | Weirich et al. |
| 6,389,878 B1 | 5/2002 | Zamfes |
| 6,637,524 B2 | 10/2003 | Kruspe et al. |
| 6,974,705 B1 | 12/2005 | Brumboiu et al. |
| 7,243,035 B2 | 7/2007 | Tison et al. |
| 7,392,138 B2 | 6/2008 | Frechin et al. |
| 7,657,392 B2 | 2/2010 | Gysling |
| 7,844,400 B1 | 11/2010 | Selman et al. |
| 8,130,591 B2 | 3/2012 | Geerits |
| 8,583,377 B2 | 11/2013 | Moake |
| 8,636,060 B2 | 1/2014 | Hernandez |
| 8,775,089 B2 | 7/2014 | Van Zuilekom et al. |
| 8,818,779 B2 | 8/2014 | Sadlier et al. |
| 8,838,390 B1 | 9/2014 | Selman et al. |
| 8,884,215 B2 | 11/2014 | Gunn et al. |
| 8,965,703 B2 | 2/2015 | Prakash et al. |
| 2004/0265176 A1 | 12/2004 | Kerherve et al. |
| 2010/0089120 A1 | 4/2010 | Hanson |
| 2011/0174541 A1 | 7/2011 | Strachan et al. |
| 2013/0263647 A1 | 10/2013 | Barrett et al. |
| 2013/0311096 A1 | 11/2013 | Greer et al. |
| 2014/0067307 A1 | 3/2014 | Guerriero et al. |
| 2014/0190747 A1 | 7/2014 | Hay |
| 2014/0291023 A1 | 10/2014 | Edbury et al. |
| 2014/0336936 A1 | 11/2014 | Inanc |
| 2015/0114714 A1 | 4/2015 | Dahl et al. |
| 2015/0170087 A1 | 6/2015 | Johnston et al. |
| 2018/0361273 A1* | 12/2018 | Henderson ......... B01D 19/0005 |

\* cited by examiner

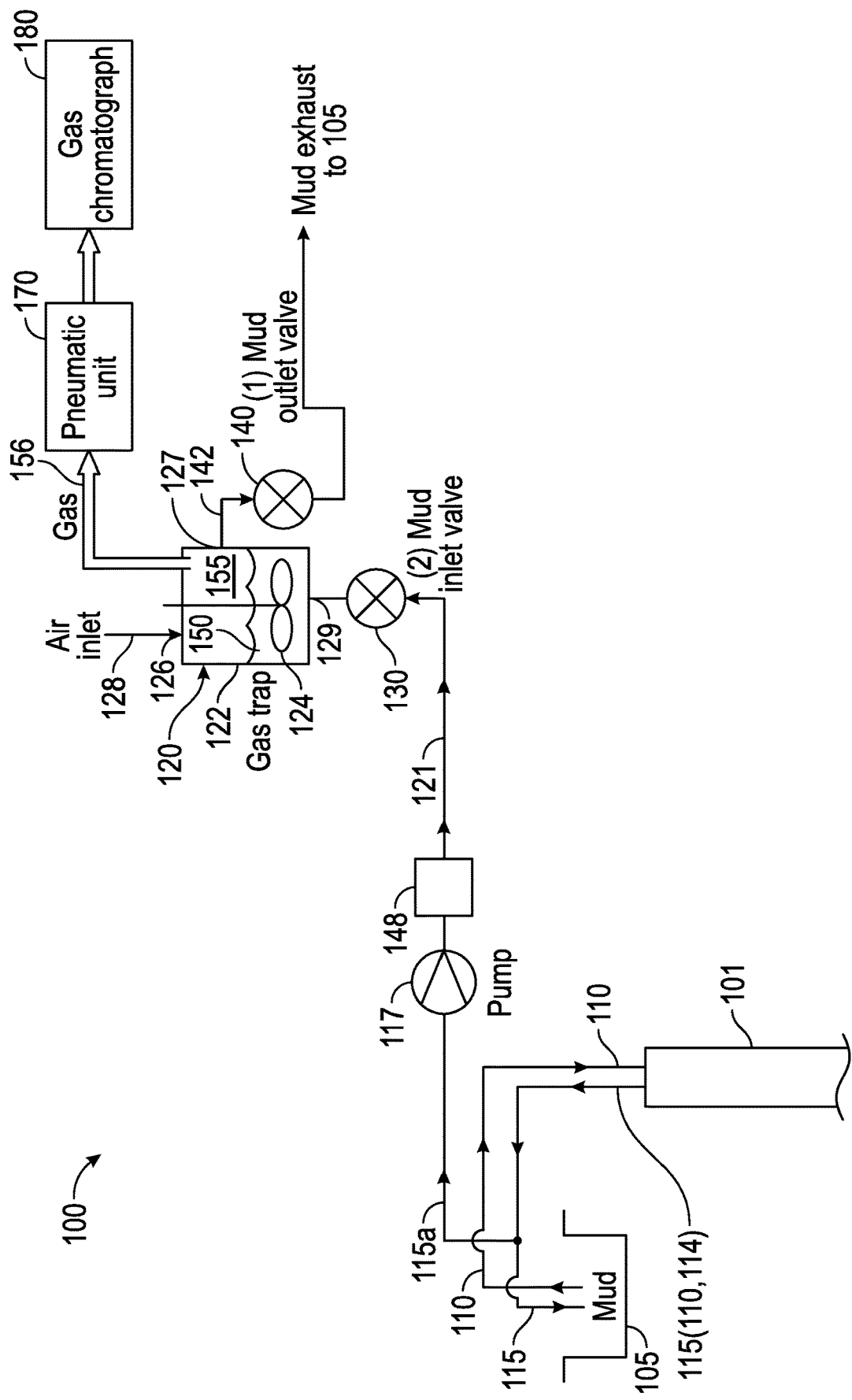

APPARATUS AND METHODS FOR DETERMINING IN REAL-TIME EFFICIENCY EXTRACTING GAS FROM DRILLING FLUID AT SURFACE

BACKGROUND

1. Field of the Disclosure

This disclosure relates generally to extraction of hydrocarbons and other elements from drilling fluid supplied into a wellbore and drilling fluid returning to surface or recirculating from the wellbore during drilling of the wellbore.

2. Background of the Art

Wellbores (also referred to herein as "wells" or "boreholes") are drilled in subsurface formations for the production of hydrocarbons (oil and gas) trapped in zones at different depths. Such wells are drilled using a drill string that includes a drilling assembly (commonly referred to as the "bottomhole assembly" or "BHA") at the bottom end of a drill pipe. A drill bit is attached at the bottom of the drilling assembly. To drill a well, the drill string is conveyed into the well. The drill bit is rotated by rotating the drill string from the surface and/or by a mud motor placed in the drilling assembly to disintegrate rock in the subsurface formation. A drilling fluid (commonly referred to as "mud") is supplied under pressure from the surface into the drill string, which fluid discharges at the bottom of the drill bit and returns to the surface via the spacing between the drill string and the well (referred to as the "annulus"). The returning fluid (also referred to herein as the "return fluid") contains the rock pieces disintegrated by the drill bit, commonly referred to as the "cuttings". When drilling through a formation zone containing gas (for example, C1-C9, IC4, 105, methylcyclohexane, benzene, toluene, CO2, Ar, etc.), condensate and oil, such elements are released from the penetrated zone into the wellbore being drilled. These released elements are then transported to the surface in the drilling fluid returning t the surface. Additional gas may be released into the mud from the oil or condensate due to changing PVT (pressure, volume, temperature) conditions from subsurface to surface. The amount of released gas, not bound or trapped in or on the cuttings, depends on the porosity, permeability and hydrocarbon saturation of the formation.

As the drilling fluid returns to the surface, cuttings are removed from the return fluid. The gases in the returning fluid are extracted to determine the amount of such gases present in the returning fluid. Determining continuously the amount of gases and other elements present in continuously flowing return fluid during drilling is often termed as "mud logging". Typically, to determine such amounts, the drilling fluid is passed through a gas trap. Air is supplied to the fluid in the gas trap and the fluid is continuously agitated with a mechanical agitator. This process separates the gas entrapped in the drilling fluid flowing through the gas trap. The separated gas is pumped out from the gas trap by a pneumatic unit and supplied to a gas measurement device or unit, such as a mass spectrometer and/or a gas chromatograph, which determines the amount (quantity) of gas present per unit volume in the drilling fluid received from the wellbore during drilling of the wellbore. Of particular relevance during drilling are the hydrocarbons and their amount released from the formation into the returning drilling fluid. This gas extraction information, when correlated to the depth of drilling, is used by operators for a variety of purposes, including, controlling drilling parameters. Depending on the drilling fluid type (water-based, oil-based, synthetic material-based), the amount of hydrocarbons in the drilling fluid returning to the surface may vary and different hydrocarbon components may have a different solubility in the drilling fluid used. Such gas extraction measurements can also be used to determine features, such as gas/oil contact and oil/water contact. Therefore, there is a need in the oil industry to have reliable measurements of hydrocarbon components in the drilling fluid returning from the wellbore. There is also a need to identify not just the relative ratios of different hydrocarbons (for example, C1 to C9) but also the total amount of gas in the drilling mud. In order to accomplish this, it is necessary to determine the gas extraction efficiency of the gas trap for each of these hydrocarbons. This gas extraction efficiency needs to be determined periodically during drilling of the wellbore for accurate determination of the hydrocarbon contents in the returning fluid.

The disclosure herein provides a system and methods for determining gas present in a continuously flowing drilling fluid received from a wellbore and the gas extraction efficiency of such system.

SUMMARY

In one aspect, a method for determining amount of selected gas extracted from a drilling fluid during drilling of a wellbore and total amount of gas present in such fluid is disclosed, that in one embodiment may include; flowing the drilling fluid through a gas trap at a constant flow rate; extracting the selected gas released from the drilling fluid flowing through gas trap and determining therefrom the amount of the extracted gas from the drilling fluid; trapping a constant volume of the drilling fluid in the gas trap; extracting the selected gas released from the constant volume and determining therefrom the total amount of the selected gas present in the drilling during drilling of the wellbore. The method further includes determining the efficiency of the gas extraction process from the amount of the selected gas extracted from the fluid flowing through the gas tap and the total amount of the gas in the constant volume.

In another aspect, a system for determining amount of a selected gas extracted from a drilling fluid during drilling of the wellbore and for determining the total amount of gas present in the drilling fluid is disclosed. The system, in one non-limiting embodiment may include: a gas trap unit for flowing the drilling fluid through the gas trap unit, wherein the gas trap unit includes an inflow valve for controlling flow of the drilling fluid into the gas trap unit and an outflow valve for controlling outflow of the drilling fluid from the gas trap unit; a gas extraction device for extracting a selected gas from the gas trap unit; a gas measuring device for receiving the selected gas extracted by the gas extraction device and determining therefrom the amount of the selected gas extracted from the fluid flowing through the gas trap unit determining the total amount of the selected gas in the drilling fluid from a constant volume of the drilling fluid in the gas trap unit.

Examples of the more important features of a system and methods have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWING

For a detailed understanding of the apparatus and methods disclosed herein, reference should be made to the accompanying drawing and the detailed description thereof, wherein like elements are generally given same numerals and wherein:

FIG. 1 shows a line diagram of a non-limiting surface logging system according to one embodiment of the present disclosure for determining gas extracted from a continuously flowing drilling fluid during drilling of a wellbore and the gas extraction efficiency of such system.

DETAILED DESCRIPTION

In general, the disclosure provides a system and methods for; (1) calculating or determining the amount various gases (selected gases) and other elements in a continuously flowing sample extracted from drilling fluid supplied to a wellbore and/or the drilling fluid returning from the wellbore and (2) determining the efficiency of such extraction process. FIG. 1 is a schematic diagram of a gas system 100 that extracts gases (including, but not limited to, C1-C9, CO2, Ar) and other elements from a continuously flowing drilling fluid supplied into the wellbore from the surface and the drilling fluid returning from the wellbore and determines therefrom the amount of gas present in a such fluid and the efficiency of such an extraction process in real time. As is well known in the oil industry, wellbores are drilled by conveying a drill string (not shown) in a wellbore, such as wellbore 101, which drill string includes a drill pipe, a drilling assembly containing a variety of sensors attached to the bottom of the drill pipe and a drill bit attached at the bottom of the drilling assembly. A drilling fluid 110 from a pit 105 is supplied under pressure into the drill string from the surface while the drill bit is rotated to cut the formation rock. The drilling fluid 110 discharges at the bottom of the drill bit. The fluid 110 returns to the surface via annuls between the drill string and the wellbore carrying therewith the formation rock pieces 114 (referred to as "cuttings") cut by the drill bit. The returning fluid 115 includes the drilling fluid 110 and the cuttings 114.

Still referring to FIG. 1, a pump 117 extracts sampling fluid 115a from the returning fluid 115 and pumps the sampling fluid 115a via line 121 into a gas trap unit or device 120 (also referred to herein as "gas trap"). A flow control device 130, such as a remotely-controlled valve, is provided to control the amount of fluid 115a pumped into the gas trap unit 120. The gas trap unit 120 includes a chamber 122 having a fluid inlet 129 and a fluid outlet 127, a fluid agitator 124 inside the chamber 122, which may be a mechanical agitator, and an inlet 126 for introducing or supplying air 128 into the chamber 122. An outflow line 142 connected to the outlet 127 and having a flow control device 140, such as a remotely-controlled valve, is provided to discharge liquid 150 from the gas trap unit 120 to the mud pit 105. A heater 148 may be provided in flow line 121 to heat the fluid 115a to a preselected temperature before supplying such fluid to the gas trap unit 120. Any gas in the chamber 122 head may be extracted by a vacuum unit, such as pneumatic device 170, and supplied to a gas measuring unit or device 180 for determining the amount of extracted gas.

The system 100 is suitable for both extracting gases from the drilling fluid 115a supplied to the wellbore and the drilling fluid returning from the wellbore 101, measuring the amount of gas extracted and for determining the efficiency of the extraction process during drilling of the wellbore. The efficiency of the gas extracted from the drilling fluid 115a during drilling of the wellbore 101 may be defined as the amount of the gas extracted from a continuously flowing fluid 115a divided by the total amount of the gas present in a fixed or constant volume of the drilling fluid. Although FIG. 1 shows that fluid 115a is sampled from the returning fluid 115, the apparatus and methods provided herein are equally applicable to the fluid 110 supplied into the wellbore. For drilling fluid supplied to the wellbore, sample is drawn from fluid 110 instead from the returning fluid 115. A method of extracting gases from the fluid 115a and determining the efficiency of such extraction process is described below. In such a method, the amount of gases extracted is calculated or determined from continuously flowing fluid 115a using the gas trap unit 120, while the total amount of such gases present in the drilling fluid 115a is calculated or determined from a constant volume sample of the fluid 115a using the gas trap unit 120. The process of extracting the gas from drilling fluid 115a and determining the amount of a particular (or selected) gas in such fluid may be referred to as the "dynamic process" while the process for determining the total amount of such selected gas present in the drilling fluid 115a from a constant volume may be referred to as a "static process". The static process may be conducted periodically during the drilling of a particular well to ensure that the total amount of gas calculated corresponds to the drilling fluid being supplied to or returned from the wellbore, as the case maybe, for accurate determination of the extraction efficiency throughout the drilling process. Periodic determination of the total amount of gas will account for any changes of the operational parameters as well changes in gas concentration and mud characteristics over time. The calculated amounts of the extracted gas and the total amount of such gas present in the fluid 115a is correlated to the depth of the wellbore from where such fluid was received. This correlation is based on the flow rate of the drilling fluid and methods of determining such depths are well known in the art. The amount of gas extracted and the total gas present in the fluid can be used to determine the extent of gas influx into the wellbore from the formation being drilled and the depth of the wellbore at which such influx occurred.

Still referring to FIG. 1, a method of extracting gas from the drilling fluid 115a may include the following steps. Open the valves 130 and 140 and turn on the pump 117 to pass the drilling fluid 115a at a constant flow rate through the gas trap unit 120. Supply the air and turn on or activate the agitator 124. At this point, the drilling fluid 115a is continuously flowing through the trap chamber 122 as such fluid is entering into the trap chamber through inlet 129 and discharging from the chamber 122 through outlet 127 at the same rate. The agitator aids in removing gas from the fluid 115a flowing through the chamber 122. The pneumatic unit 170 continuously extracts gas leaving the fluid 115a in the chamber 122 head and passes it to the gas measuring unit 180, which provides measurements from which the amount of gas extracted per unit volume of fluid 115a is calculated or determined. Thus, in the dynamic process, the valves 130 and 140 are open, the drilling fluid 115a is continuously passing through the gas trap unit 120 at a constant rate and at a constant temperature, if a heater is provided. The agitator 124 causes the gas trapped in the fluid 115a passing through the gas trap unit 120 to release, which gas is extracted by the pneumatic unit 170 and supplied to the measuring unit 180 for measuring the amount of gas in the drilling fluid during drilling of the wellbore, i.e., in real time. Before initiating the static process, the agitator 124 is turned off until stable readings are obtained from the measuring unit 180 with the drilling fluid 115a still continuously flowing through the gas trap unit 120. It is desirable to wait till measurements from the measuring unit 180 under continuous operations with the agitator off are stable, such as +/−5% over a selected time period, for example two minutes. This step in the method may be referred to as dynamic test with the agitator off. To perform the static test, i.e., to calculate or determine the total amount of gas in the drilling fluid 115*a*, the pump 117 is turned off and the valves 130 and 140 closed. This traps a fixed or constant volume of the drilling fluid 115*a* in the chamber 122 of the gas trap unit 120. The agitator 124 is turned on to release gas from such constant volume into the chamber 122. The pneumatic unit 170 extracts the gas from the chamber 122 and supplies it to the measuring unit 180, which measures the extracted gas until the readings of the measuring unit 180 are the as a preselected or predetermined base value. The static process or test provides the total amount of gas trapped in the returning drilling fluid 115*a* using a constant volume of the drilling fluid 115*a*. The total amount of gas present in the drilling fluid 115 can readily be extrapolated from the static process or test measurements. The inlet valve 130 and the outlet valve 140 are then opened and pump 117 started to continue to conduct the dynamic test as described above. The static test described above is periodically performed during the drilling of the wellbore to account for any changes in the mud characteristics. A base line for the above tests may be established when there is no formation gas coming out of the formation. This test may be done after the system 100 has been calibrated. As noted earlier, the above described process may be used for sample fluid withdrawn from fluid 110.

The foregoing disclosure is directed to the certain exemplary non-limiting embodiments. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A method for determining amount of a selected gas extracted from a drilling fluid during drilling of a wellbore and total amount of the selected gas present in the drilling fluid, the method comprising:
    flowing the drilling fluid through a gas trap at a constant flow rate;
    extracting to a measurement device, via a gas extraction device disposed between the gas trap and the measurement device, the selected gas released from the drilling fluid flowing through the gas trap and determining therefrom the amount of the extracted gas in the drilling fluid flowing through the gas trap, the selected gas being released from the drilling fluid via an agitator of the gas trap;
    determining a stability of gas measurements over a selected time period under continuous flow operations with the agitator turned off;
    trapping a constant volume of the drilling fluid in the gas trap; and
    extracting to the measurement device, via the gas extraction device with the agitator on, the selected gas released from the constant volume and determining therefrom the total amount of the selected gas present in the constant volume of the drilling fluid.

2. The method of claim 1 further comprising determining efficiency of extracting the selected gas from the determined amount of the selected gas extracted from the drilling fluid flowing through the gas trap and the total amount of the selected gas determined from the constant volume of the drilling fluid in the gas trap.

3. The method of claim 1, wherein the drilling fluid flowing through the gas trap and the constant volume of the drilling fluid in the gas trap is one of: drilling fluid supplied to the wellbore during drilling of the wellbore; and drilling fluid received from the wellbore during drilling of the wellbore.

4. The method of claim 1, wherein flowing the drilling fluid through a gas trap at a constant flow rate comprises extracting a portion of the drilling fluid supplied to or received from the wellbore by a pump with the gas trap open.

5. The method of claim 1, wherein trapping a constant volume of the drilling fluid in the gas trap comprises supplying the drilling fluid to the gas trap and closing off the gas trap.

6. The method of claim 1 further comprising heating the drilling fluid before such fluid is supplied to the gas trap.

7. The method of claim 1 further comprising at least one of:
    agitating the drilling fluid flowing through the gas trap to release the selected gas from the drilling fluid flowing through the gas trap; and
    agitating the constant volume of drilling fluid to release the selected gas from the constant volume of drilling fluid trapped in the gas trap.

8. The method of claim 1, wherein determining the amount of the selected gas extracted from the drilling fluid flowing through the gas trap and the total amount of the selected gas present in the constant volume of the drilling fluid are determined using a one or more gas traps.

9. The method of claim 1 further comprising: periodically determining the total amount of the selected gas present in the constant volume of drilling fluid during drilling of the wellbore to account for characteristics of formation associated with the total amount of the selected gas.

10. The method of claim 1 further comprising correlating at least one of: the amount of selected gas extracted from the drilling fluid flowing through the gas trap and the total amount of the selected gas present in the constant volume of drilling fluid to a depth of the wellbore.

11. The method of claim 10 further comprising determining, from one of the amount of the selected gas extracted from the drilling fluid flowing through the gas trap and the total amount of the selected gas present in the constant volume of drilling fluid, a characteristic of a formation through which the wellbore is being drilled.

12. The method of claim 1 further comprising determining, from one of the amount of the selected gas extracted from the drilling fluid flowing through the gas trap and the total amount of the selected gas in the constant volume of drilling fluid, a presence of influx of the selected gas into the wellbore and a corresponding depth of the wellbore.

\* \* \* \* \*